July 23, 1957

J. J. RILEY ET AL 2,800,624

NON-SYNCHRONOUS COMBINATION WELDER CONTROL

Filed April 21, 1954

2 Sheets-Sheet 1

INVENTORS
JOSEPH J. RILEY
CLAYTON E. STAMBAUGH

BY *Francis J. Klempay*

ATTORNEY

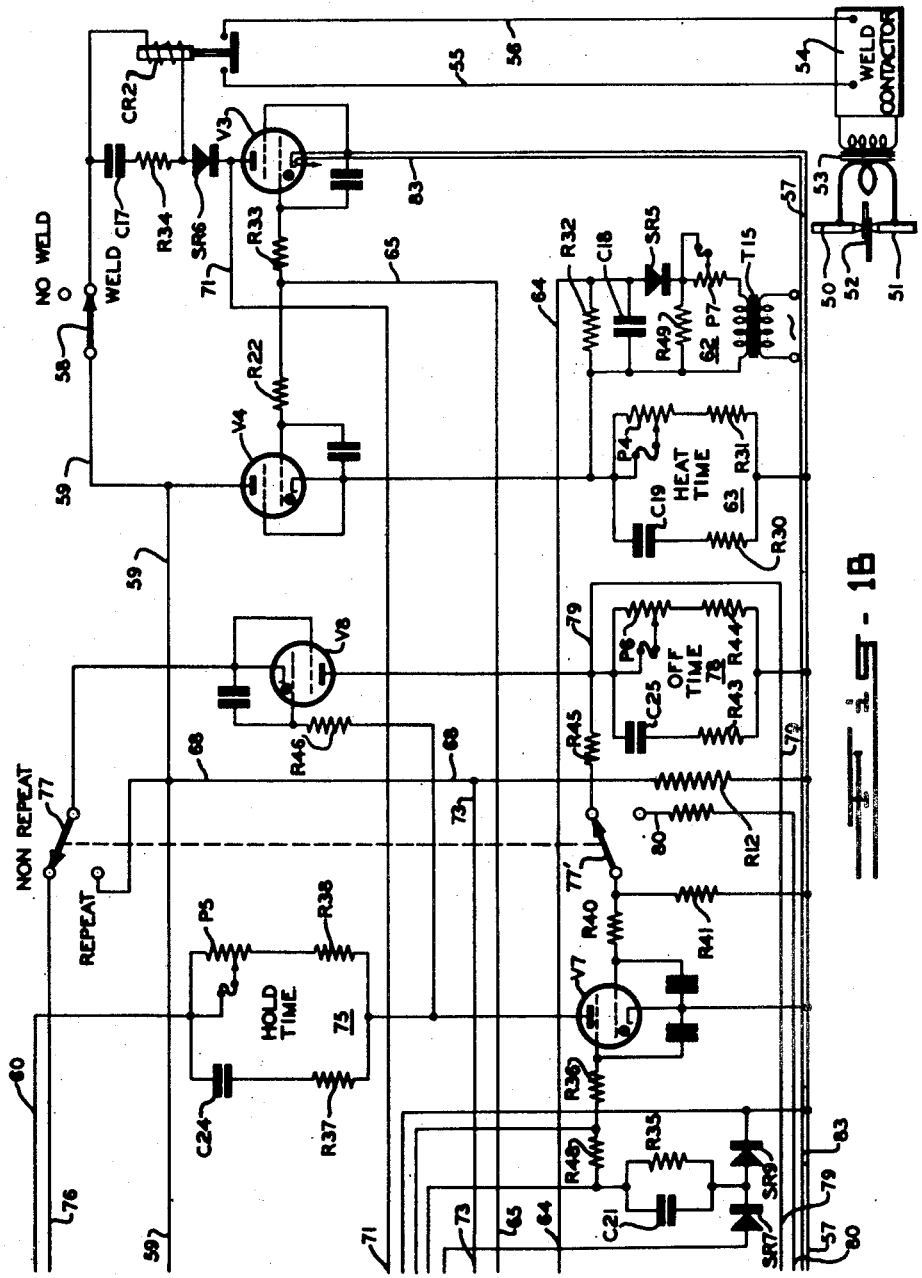

United States Patent Office 2,800,624
Patented July 23, 1957

2,800,624

NON-SYNCHRONOUS COMBINATION WELDER CONTROL

Joseph J. Riley, Warren, and Clayton E. Stambaugh, Girard, Ohio, assignors to The Taylor-Winfield Corporation, Warren, Ohio, a corporation of Ohio Application April 21, 1954, Serial No. 424,696

8 Claims. (Cl. 323—18)

The present invention relates to the art of electric resistance welding, and more particularly to an improved electronic sequence control for use in conjunction with an electric resistance welding machine for controlling electrode movements and the application of welding energy.

In electric resistance spot welding, for example, a complete welding cycle consists of a "squeeze time" wherein the welding electrodes are moved into firm contact with the workpieces, a "weld time" or "heat time" wherein welding energy is passed through the workpieces, a "cool time" or "hold time" wherein the electrodes are maintained in pressure contact with the workpieces following the termination of the flow of welding energy, and an "off time" wherein the workpieces are shifted with respect to the welding electrodes preparatory to performing a succeeding welding operation. In the welding of heavy workpieces it is often desirable to effect a single weld by applying a series of pulses of welding energy, each followed by a "cool time" wherein some of the welding heat is dissipated into the metal surrounding the weld. Thus, each "weld time," or "weld interval" as it is more often designated, is comprised of a plurality of alternate heat and cool times, and in this instance the hold time follows the complete weld interval, rather than each heat time. The invention set forth herein is concerned with automatic control devices for effecting the various sequentially related control phases mentioned above.

Sequence control circuits of this general type are, of course, quite old in the broad sense. Therefore the present invention is concerned with specific improvements in controls of this general type for the purpose of providing a more simplified and economical installation which is characterized by high accuracy and dependability with a minimum of maintenance problems.

A more specific object of our invention is the provision of an improved sequence control which is completely electronic in the sense that all timing functions are effected electronically and which is provided with a number of novel safety features whereby upon failure of certain of the electronic devices to function properly the welding machine and/or work will not be damaged. As will be readily understood, in any control circuit comprising a plurality of electronic discharge devices or valves there are routine failures as the electronic valves eventually burn out or otherwise fail to operate properly after extended periods of use. The control circuit of our invention incorporates a novel arrangement of circuit components so that the failure of one or more of the electronic valves cannot operate to overextend the weld period.

Another object of the invention is the provision in a control circuit of the type having means to effect single or multiple-pulse welds of an improved and simplified circuit arrangement whereby during "impulse" or multiple-pulse welds a selected number of complete pulses or heat times may be effected, and whereby the last pulse or heat time is always carried to completion even in instances where the weld interval timer completes its timing function before the termination of such last heat time.

Yet another object of the invention is the provision of a complete electronic sequencing circuit having the above described and other advantageous characteristics which employs a minimum number of standard electronic discharge devices or valves incorporated into a simplified overall control circuit.

The above and other objects and advantages of the invention will become apparent upon full consideration of the following detailed specification and accompanying drawing wherein is disclosed a certain preferred embodiment of our invention.

The drawing, comprised of two parts, Figure 1A and Figure 1B, is a schematic representation of an electronic sequence control incorporating the teachings of our invention.

Referring now to the drawing, the numerals 50 and 51 designate conventional electric resistance welding electrodes, between which are shown overlapped workpieces 52 in position to be welded. The electrodes 50 and 51 form part of a secondary circuit of a complete welding machine, not shown, which includes a suitable welding transformer 53. The primary circuit includes a suitable contactor 54 which, for the purpose of the present invention, may be purely conventional, comprising a pair of inversely related mercury arc discharge devices or ignitrons, for example. In the present illustration the contactor 54 is so arranged that upon completion of a control circuit comprising conductors 55 and 56 the contactor 54 will pass welding energy to the electrodes 50 and 51.

For controlling the operation of the contactor 54 we provide a control relay CR2 which is connected in series in the anode-cathode circuit of an electronic valve V3. The valve V3 connects at its cathode with a supply conductor 57 leading to a center terminal of a supply transformer T1 (Fig. 1A), while the anode of valve V3 connects with another terminal of transformer T1 through rectifier SR6, operating coil of relay CR2, weld-no-weld switch 58, auxiliary supply conductor 59, contacts $a$ and $b$ of a control relay CR1 and supply conductor 60. Transformer T1 connects with a suitable A. C. supply 61.

As will be readily observed, when relay CR1 is energized anode-cathode potential is supplied to valve V3, and at such time, if its control grid is properly conditioned, valve V3 will conduct, energizing relay CR2 and causing the flow of welding current to the workpieces 52. In accordance with conventional practice a series-connected resistor and capacitor R34 and C17 are connected in parallel with relay CR2 to maintain the same in an energized condition during alternate half-cycle periods of the A. C. supply potential, when valve V3 is non-conducting.

Valve V3 is normally maintained in a non-conductive state by means of a negative grid bias supply 62 comprising resistors R32 and R49, capacitor C18, rectifier SR5, potentiometer P7 and transformer T15, the latter connecting with the A. C. supply source. This biasing network is referenced to the cathode of V3 through a "heat time" network 63, comprising resistors R30 and R31, capacitor C19 and potentiometer P4. And connected in series with the biasing network 62 is a transformer T4 (Fig. 1A), the primary winding of which is connected in series with the anode-cathode circuit of a firing valve V2. Conductor 64 connects one terminal of transformer T4 to the biasing network 62, and conductor 65 connects the other terminal to the control grid of valve V3, through a conventional current limiting resistor R33. The arrangement is such that the heat time network 63 and/or the transformer T4 can overcome the negative biasing potential of network 62 to render valve V3 conducting at desired times.

Connected in series with the heat time network 63 is a valve V4 which connects at its cathode with auxiliary supply conductor 59 so that anode-cathode potential will be applied simultaneously to valves V3 and V4. The control grid of valve V4 connects through current limiting resistor R22 to conductor 65, and hence through transformer T4 to the biasing network 62. It should be noted, however, that while the grid circuit of valve V3 includes heat time network 63, biasing network 62 and transformer T4, in series, the grid circuit of valve V4 includes only the biasing network 62 and transformer T4.

As will be hereinafter more fully described, valves V3 and V4 are simultaneously rendered conductive by the application from transformer T4 of a positive grid signal which overcomes the bias potential of the network 62, the heat time network 63 being fully discharged at such time. And as will also be described later, the arrangements are such that transformer T4 is energized for only one half cycle so that valve V4 is rendered conductive for only one half cycle, after which the network 62 maintains a negative bias potential on its grid to prevent further conduction. However, during the half cycle that valve V4 conducts capacitor C19 of the heat time network is charged in opposition to the negative potential of the biasing network 63, the potential of capacitor C19 being initially greater than that of the network 62 so that valve V3 continues to conduct after conduction is terminated in valve V4.

After being charged by one-half cycle period of conduction in valve V4 capacitor C19 begins to discharge through the heat time network 63, at a rate determined by the adjustment of potentiometer P4. After a predetermined time the potential on capacitor C19 dissipates sufficiently so that the negative biasing potential of network 62 predominates and valve V3 is rendered non-conductive, de-energizing relay CR2 and interrupting the flow of welding energy to workpieces 52.

To energize transformer T4 in the desired manner we have connected the firing valve V2 in anti-parallel relation to valves V3 and V4; that is the anode of valve V2 connects through transformer T4 and resistor R1 to the lower supply conductor 57, while the cathode connects through contacts $a$ and $b$ of relay CR1 to the upper supply conductor 60. Thus, during the half cycle of supply potential when conductor 57 is positive with respect to conductor 60 valve V2 will conduct, energizing transformer T4. Then, during the following half cycle of supply potential valve V2 is non-conducting, and the decay of flux in transformer T4 causes a high reverse potential to appear across the secondary terminals, which constitutes the initiating or firing signal for valves V3 and V4. During the above mentioned following half cycle anode-cathode potential is applied to valves V3 and V4 so that the same may conduct immediately after valve V2 stops conducting.

It will be understood that since valve V4 conducts for only a single half cycle to charge capacitor C19 provisions must be made for insuring uniform conduction time after time so that succeeding heat times may be uniform. To this end we have followed the teachings of copending application Ser. No. 336,242, filed February 11, 1953, by Joseph J. Riley and Lauri J. Murto for "Synchronous Timing Control for Electric Resistance Welding Apparatus." As taught in the aforementioned application valve V2 is provided with a screen grid circuit including a transformer T5, potentiometer P8 and a phase shifting circuit comprising resistor R2 and capacitor C15. The potential applied across the primary of transformer T5 is approximately 90° ahead of the supply potential, and the arrangement is such that when valve V2 is otherwise conditioned for conduction it must begin conduction during the first portion of its half-cycle period, or not at all. And while there may be certain variations from time to time in that exact point at which valve V2 begins to conduct, it is assured that there will be a substantial period of conduction—enough to fully energize transformer T4 so that the reverse potential or inductive "kick" for initiating conduction in valves V3 and V4 is sharp and strong at all times.

It is conventional in welding operations of this nature to provide a predetermined squeeze time, which is a delay period following the movement of the welding electrodes into welding position and prior to the initiation of flow of welding energy. In the present circuit the control relay CR1 is provided with contacts $d$ which complete a control circuit to an actuating mechanism 66 for the electrodes 50 and 51. Thus, when relay CR1 is energized the electrodes will move into engagement with the work 52. Energization of relay CR1 also applies anode-cathode potential to valve V2. However, it is desirable to maintain this valve in a non-conducting state for a predetermined squeeze time period to defer the flow of welding energy until the electrodes are properly seated on the work. For this purpose we provide a squeeze time network 67, comprising resistor R11, capacitor C5 and potentiometer P1, connecting the control grid of valve V2 and referenced to its cathode. Also connecting the cathode of valve V2 is auxiliary supply conductor 59 which has a connection with the main supply conductor 57 through conductor 68 and resistor R12 (center, Fig. 1B). The arrangement is such that when relay CR1 is de-energized the auxiliary conductor 59 is at the potential of main supply conductor 57 although when relay CR1 is energized auxiliary conductor 59 is at the potential of main supply conductor 60. Thus, prior to the energization of relay CR1 capacitor C5 of the squeeze time network 67 is charged by grid rectification in valve V2, through a circuit including resistor R12 and conductors 68 and 59. When the welding sequence is initiated by energizing relay CR1 the squeeze time capacitor C5 begins to discharge, maintaining valve V2 non-conductive for a predetermined time, while the electrodes 50 and 51 become properly seated upon the work.

Connected in series with transformer T5 and the screen grid of valve V2 is a second timing network 69, called a "cool time" network, which comprises resistors R14, R15 and R16, capacitor C9 and potentiometer P2, the network being referenced to the cathode of valve V2 at the auxiliary supply conductor 59. Conductor 70 connects the cool time network 69 with one terminal of transformer T5. By means of a conductor 71 and rectifier SR3 the cool time network 69 is also connected in series with the weld valve V3 so that when valve V3 conducts capacitor C9 is charged to place a negative blocking potential on the screen grid of valve V2, such potential being in excess of that impressed by the transformer T5 so that valve V2 is rendered non-conductive. It will be remembered that valve V3 begins to conduct on the next half cycle of supply potential following the first half cycle of conduction in valve V2. Thus, conduction in V2 is blocked after a single half cycle of operation, as is desired.

As will be more fully described, in a welding operation of the impulse type, involving a plurality of welding pulses for a single weld, anode-cathode potential is maintained on valve V2 for the full impulse period. Thus, after a first heat time period has ended, as capacitor C19 of the heat time network discharges, the charging of capacitor C9 of the cool time network 69 ceases and this last mentioned capacitor begins to discharge. After a sufficient cool time period valve V2 is again rendered conducting to initiate a new heat time period. And this sequence repeats until the weld interval time has ended.

For timing the weld interval we provide, in accordance with the teachings of the invention, a weld interval network 72 comprising resistors R18 and R20, capacitor C11 and potentiometer P3, the network 72 being connected in series with the anode-cathode circuit of a valve V5. Valve V5 is connected directly across the main supply conductors 57 and 60 and is normally conducting so that capacitor C11 of the weld interval network is normally charged.

Connected across the main supply conductor 57 and auxiliary supply conductor 59 in anti-parallel relation to valve V5 is a valve V6. The valve V6 is connected in series relation with the cool time network 69 through rectifier SR1, and is provided with a control grid circuit connecting the weld interval timer 72 through a current limiting resistor R17. The arrangement is such that valve V6 is maintained in a normally non-conducting state by the negative blocking potential of capacitor C11.

Valve V5 is provided with a control grid circuit comprising a capacitor-resistor network C13—R10, secondary 2a of a transformer T2, secondary 3a of a transformer T3 and resistors R29 and R25. Secondary 3a and resistor R29 are shunted by a resistor R28, and capacitor C13 is shunted by a low ohm resistor R24 and normally closed contacts e of relay CR1. The primary of transformer T2 is connected in series with the weld tube V3, through conductor 71, and is therefore energized when welding current is flowing. The polarity of the secondary 2a is such that when transformer T2 is energized valve V5 conducts through its grid circuit, charging capacitor C13 and placing a negative blocking bias upon the grid of valve V5. In this respect it will be noted that in the half-cycle periods in which valve V3 conducts, valve V5 is non-conducting due to the reverse anode-cathode potential applied thereto, valves V3 and V5 being connected in anti-parallel relation. It will be further noted that contacts e of relay CR1 are open at this time so that capacitor C13 must discharge through resistor R10, rather than through the shunt resistor R24. And in accordance with the teachings of the invention the capacitor-resistor network C13—R10 is arranged so that the time required for capacitor C13 to discharge sufficiently to permit valve V5 to conduct is somewhat greater than the maximum cool time period. Thus, during a weld interval comprised of a number of heat and cool time periods valve V5 is maintained non-conductive during each cool time period until the following heat time period when the charge on capacitor C13 is again renewed.

After a predetermined time following the initial flow of welding current the charge on the weld interval capacitor C11 dissipates, removing the blocking bias from valve V6 and causing the same to conduct. Valve V6, being in series with the cool time network 69 maintains a full charge on cool time capacitor C9 so that valve V2 is maintained in a non-conducting state notwithstanding the eventual interruption of conduction in the weld valve V3.

Of course it will be understood that each complete weld pulse may involve many cycles of electrical energy, while each complete cool time will also comprise a uniform number of cycles. Thus, it is not uncommon that the weld interval network 72 times out while a weld cycle, for example, is only partially completed. For such occasions we have provided certain interlocking circuitry, to be fully described later, which insures that the weld interval will continue until the last heat time period is fully completed, notwithstanding that the weld interval network 72 may have previously timed out.

When valve V6 begins to conduct, after the weld interval network times out, the primary of transformer T3 is energized, the latter being in series with the anode-cathode circuit of valve V6, the circuit being traced through conductors 73 and 68 to auxiliary supply conductor 59. Secondary 3b of transformer T3 is connected through rectifier SR7 (lower left, Fig. 1B) across a capacitor-resistor network C21—R35 which connects through resistors R48 and R36 with the screen grid of a normally conducting valve V7, the grid circuit being referenced to cathode potential at supply conductor 57 through rectifier SR9. Thus, when secondary 3b is energized capacitor C21 charges and valve V7 would normally be rendered non-conducting. However, also connected in the screen grid circuit of valve V7, between resistors R48 and R36 is secondary 2b of transformer T2. The polarity of secondary 2b is such that when energized it applies a positive signal to the screen grid of valve V7 which overcomes the negative signal applied by capacitor C21 so that valve V7 continues to conduct.

It will be recalled that transformer T2 is energized by conduction in the weld valve V3, and it will therefore be seen that even though the weld interval network has timed out and valve V6 is conducting, valve V7 will remain conducting until the regular heat time ends and valve V3 stops conducting.

Connected in series in the anode-cathode circuit of valve V7 is a hold time network 75 comprising resistors R37 and R38, capacitor C24 and potentiometer P5. Valve V7 is connected directly across the main supply conductors 57 and 60 and conducts during the initial portions of the control cycle. Thus, at the end of a weld interval, when V7 is rendered non-conducting, capacitor C24 is fully charged and maintains a blocking bias on the control grid of a valve V8. Anode-cathode potential is applied to valve V8 through contacts a of relay CR1, second auxiliary supply conductor 76, repeat-nonrepeat switch 77, and main supply conductor 57. Thus, after valve V7 is rendered non-conducting, and the charge on capacitor C24 dissipates, valve V8 begins to conduct.

Valve V8 is connected in anti-parallel relation with valve V7, and includes in series in its anode-cathode circuit an off time network 78 comprising resistors R43 and R44, capacitor C25 and potentiometer P6. Capacitor C25 charges upon conduction in valve V8 and places a negative blocking bias on the control grid of valve V7, through resistor R45, repeat-nonrepeat switch 77' and resistor R40.

Also connecting the upper or negative terminal of capacitor C25 is a conductor 79 which connects with the control grid of a valve V1 (left, Fig. 1A). The valve V1 is connected in series with the energizing coil of relay CR1 and is connected across the main supply conductors 57 and 60 through a manual start switch S which is commonly in the form of a foot-operated control. Connected in parallel with the switch S are contacts a of relay CR1 forming an interlocking or "holding" circuit so that when the relay is energized anode-cathode potential is maintained upon valve V1.

Valve V1 is rendered conducting at the beginning of a welding operation by closing switch S and remains conducting throughout the whole of the sequence as heretofore described, maintaining relay CR1 in an energized condition. However, at the end of the hold time period, when valve V8 begins to conduct, a negative blocking bias is applied to valve V1 through conductor 79 so that valve V1 is rendered non-conducting and relay CR1 is de-energized. Normally this will de-energize the entire control circuit by removing anode-cathode potential from valves V1, V2, V3, V4, V6 and V8. Valves V5 and V7 are connected directly to the main supply conductors 57 and 60 and therefore remain conducting as long as power is supplied at transformer T1. By this means the weld interval and hold time networks are maintained in a fully charged condition.

In the illustrated circuit the repeat-nonrepeat switch 77—77' is set for nonrepeat operation; that is, after one complete sequence of operations is completed the circuit is de-energized until the start switch S is reclosed to initiate a new cycle of operations. Switch 77, in the position shown, connects the cathode of valve V8 to the supply conductor through conductor 76 and contacts a of relay CR1 and/or switch S to main supply conductor 60. Thus, in the event switch S is held closed after the normal cycle of operations has ended anode-cathode potential will be maintained on valves V1 and V8, but the latter will continue to conduct and maintain a blocking bias on valve V1 to maintain it in a non-conducting state.

When switch 77—77' is placed in "repeat" position the cathode of valve V8 is connected to supply conductor 60 through conductor 59 and contacts b and a of relay CR1, and the control grid of valve V7 is connected through conductor 80 to the anode of valve V1, rather than to the negative terminal of capacitor C25. Thus, when switch S is held closed at the end of a complete sequence of operations valve V8 fires momentarily to charge capacitor C25 and extinguish valve V1, de-energizing relay CR1. This brings conductor 80 up to the potential of main supply conductor 60, causing valve V7 to refire immediately. Valve V8, being without anode-cathode potential, is extinguished, and is thereafter maintained in a non-conducting state by conduction in valve V7. The off time network 78 then begins to time out, and after a predetermined time valve V1 is rendered conducting again, energizing relay CR1 and initiating a new sequence of operations. This same sequence will repeat as long as switch S is held closed; and the series is terminated by opening switch S, after which the sequence of operations then in progress will be completed before the circuit is de-energized.

In certain operations a single weld pulse, or spot, may be desired, and for such cases we provide a spot impulse switch 81 which is placed in the anode-cathode circuit of valve V5 and which is adapted, when placed in the "spot" position, to shunt out resistor R20 and potentiometer P3 of the weld interval network so that the charge on capacitor C11 dissipates rapidly after termination of conduction in valve V5. Thus, valve V6 begins to conduct shortly after the first weld period or heat time begins and capacitor C9 of the cool time network is maintained in a fully charged condition even after the weld valve V3 has stopped conducting. This maintains a hold-off bias on valve V2, rendering both it and the weld valve V3 non-conducting for the remainder of the sequence of operations.

As a safety feature we connect the cathode heaters of valves V3 and V6 in series through conductor 83 so that failure in this element of the valve V6 will prevent conduction in the weld valve V3. As another safety feature we provide a secondary 3a for transformer T3, which is operative when valve V6 conducts to charge capacitor C13 through grid rectification in valve V5, in the same manner as such charging is effected through secondary 2a. The arrangement is such that valve V5 will be maintained in a non-conducting state through conduction in V6, so that in the event of failure of valves V7 or V8 to fire properly to de-energize valve V1 and relay CR1 a weld time or interval will not be improperly reinitiated.

*Summary of operation*

At the beginning of a welding sequence valves V5 and V7 are conducting, all others being non-conducting. Switch S is closed, causing valve V1 to conduct and energizing relay CR1. Electrodes 50 and 51 close onto the work at this time.

After a predetermined squeeze time interval capacitor C5 discharges and valve V2 conducts, sending a firing pulse through transformer T4 to valves V4 and V5. The last mentioned valves conduct on the next following half cycle, closing weld relay CR2, charging heat time capacitor C19 and cool time capacitor C9 and extinguishing valve V2. Weld current flows as long as relay CR2 remains closed.

Conduction in valve V3 renders valve V5 non-conducting and capacitor C11 begins to discharge to time weld interval. During weld interval valve V3 may stop conducting as heat time capacitor C19 discharges. Then valve V2 resumes conduction after cool time capacitor C9 discharges. Firing of valve V2 starts conduction in valves V3 and V4 again, the cycle of heat time-cool time being repeated throughout the entire weld interval.

When weld interval capacitor C11 discharges, valves V6 conducts holding charge on cool time capacitor C9 and placing hold-off bias on valve V7. Valve V7 then ceases to conduct, unless heat time is in progress, in which case transformer secondary 2b maintains conduction in valve V7 until end of heat time.

After valve V7 stops conducting hold time capacitor C24 discharges and after a time renders valve V8 conducting. This places hold-off bias on valve V1, preventing conduction therein and de-energizing relay CR1 to end the sequence.

For repetitive operations valve V8 fires momentarily and charges off time capacitor C25, placing temporary hold-off bias on valve V1. After predetermined time valve V1 resumes conduction, starting a new sequence of operations.

Thus, it should be apparent that we have accomplished the objects initially set forth. We have provided a comprehensive sequence control which is fully electronic in its timing functions, which employs a minimum number of standard gaseous discharge devices while being highly accurate and versatile, and which incorporates a number of safety features whereby in the event of tube failure at any part of the circuit the flow of weld current will not be undesirably initiated or extended.

One of the novel features of the invention is our circuit arrangement for insuring proper timing out of a heat time period after expiration of the weld interval. Thus, in the illustrated circuit, secondary 3b acts to extinguish valve V7 to begin timing the hold time period, while secondary 2b applies an overbearing signal to maintain conduction in valve V7 until the flow of weld current has terminated.

Another novel feature of the invention is the control arrangement for valve V5, including transformer T2 and capacitor C13 for rendering valve V5 non-conductive during a repeated series of heat and cool times, and means including transformer T3 for maintaining valve V5 non-conductive following the weld interval, in the event of tube failure in other parts of the circuit. And, of course, this feature further combines with our series-connected cathode heater arrangement for valves V3 and V6, so that in cases where V6 cannot fire to energize transformer T3 by reason of an open heater circuit, valve V3 cannot fire so that no damage results to the welding machine and/or work.

Our circuit is readily adaptable to the incorporation of heat control facilities of conventional design, in which case the contactor relay CR2 may be eliminated and the conduction of valve V3 employed to trigger all-electronic heat control circuits, in accordance with known practices.

It should be understood, however, that variations may be made from the control circuit herein shown and specifically described without departing from the spirit and scope of the invention. Reference should therefore be had to the following appended claims in determining the true measure of the invention.

We claim:

1. In a welding control of the type adapted to control the flow of welding current and having means for timing a weld interval comprising a plurality of heat and cool times, the combination of a weld valve operative when conducting to allow the flow of welding current, means associated with said weld valve to initiate and sustain conduction in said weld valve for timed periods, means comprising a capacitor-resistance cool time network coupled with said means to initiate for maintaining said weld valve non-conductive for predetermined times following said timed periods, means comprising a capacitor-resistance interval timing network coupled with said weld valve for blocking reinitiation of conduction in said weld valve following a predetermined number of heat and cool times, and a capacitor-resistance hold time network associated with said initiating means, means responsive to the timing out of the capacitor of said interval timing network tending to render said hold time network effective, and means coupled with said weld valve for maintaining said hold time network ineffective while said weld valve is conducting.

2. Apparatus according to claim 1 further including a discharge valve connected in series with said hold time network, said discharge valve being normally conducting to charge the capacitor of said hold time network, said means responsive to the timing out of said capacitor of said interval timing network comprising means associated with and tending to render said discharge valve non-conducting, and said means coupled with said weld valve comprising means tending to maintain conduction in said discharge valve.

3. In a welding sequence control for controlling the flow of welding current the combination of a capacitor-resistance interval timing network, a normally conducting timing valve coupled with said timing network for charging the capacitor of said network, a weld valve operative on conduction to allow conduction of welding current and connected with said timing network, means to initiate conduction in said weld valve, means to block said means to initiate comprising an electric valve coupled with said means to initiate, said electric valve having a grid circuit including said interval timing network, said electric valve being rendered conductive upon discharge of the capacitor of said timing network, sequencing means including electric discharge valves for de-energizing said sequence control following discharge of the capacitor of said interval timing network, and means coupling said electric valve and said timing valve operative to maintain said timing valve non-conducting when said electric valve is conducting to prevent reinitiation of conduction in said weld valve in the event of failure of said electric discharge valves.

4. Apparatus according to claim 3 further including cathode heaters for said weld valve and said electric valve, and means connecting said heaters in series whereby upon opening of the heater circuit for said electric valve said weld valve is rendered inoperative.

5. In a welding control of the type adapted to control the flow of welding current and having means for timing a weld interval comprising a plurality of heat times when welding current flows and cool times and having means for effecting a hold time following a weld interval the combination of a capacitor-resistance weld interval network, a capacitor-resistance hold time network, a charging valve connected with and adapted to charge the capacitor in said hold time network, said charging valve being normally conductive and having a grid circuit, means in said grid circuit coupled with said weld interval network tending to render said charging valve non-conductive after discharging of the capacitor of said weld interval network, and additional means in said grid circuit for maintaining said charging valve conductive during heat time periods, said last mentioned means being operative to overcome said means tending to render said charging valve non-conductive whereby said charging valve will remain conducting throughout the whole of any heat time in progress when the capacitor in said weld interval network times out.

6. In a control circuit adapted to control the flow of welding current and for timing a weld interval comprised of a plurality of heat and cool times, a capacitor-potentiometer timing network; a normally conducting timing valve associated with said network for charging said network; and means operative upon the initiation of a weld interval to block conduction in said timing valve; said last mentioned means comprising a grid circuit for said timing valve, a weld valve operative when conducting to allow the flow of welding current, and a transformer in series with said weld valve and coupled with said grid circuit, said grid circuit including a capacitor and means providing a low-rate discharge path for said capacitor, said capacitor being charged by said transformer during periods of conduction of said weld valve and maintaining said charge during cool time periods.

7. In a welding control adapted to control the flow of welding current and of the type having means for timing a plurality of heat and cool times, the combination of a weld valve, means to initiate conduction in said weld valve whereby welding current is caused to flow comprising an initiating valve, means to sustain conduction in said weld valve for predetermined heat time periods comprising a capacitor-resistance heat time network connected in the grid circuit of said weld valve, a capacitor-resistance cool time network connected in series with said weld valve, said initiating valve having a grid circuit including said cool time network whereby upon conduction in said weld valve said initiating valve is rendered non-conducting for a predetermined period including a cool time period following discontinuance of conduction in said weld valve, a capacitor-resistance weld interval timing network for timing an interval comprised of a plurality of heat and cool times, an electric valve having a grid circuit including said interval timing network, said electric valve being non-conductive when the capacitor of said interval timing network is charged, means operative upon the initiation of said weld valve to cause the capacitor of said interval timing network to begin discharging, said electric valve being connected in series with said cool time network whereby to maintain the capacitor of the same in a charged condition following an interval timing period to prevent conduction in said initiating valve.

8. Apparatus according to claim 7 further characterized by a timing valve connected in series with said interval timing circuit, said timing valve having grid circuit means associated with said weld valve for rendering said timing valve non-conducting when said weld valve conducts, said grid circuit means including energy storage means for maintaining said timing valve non-conducting for predetermined periods following termination of conduction in said weld valve.

References Cited in the file of this patent
UNITED STATES PATENTS 2,574,939  Stanback et al. _____ Nov. 13, 1951